United States Patent
Olivier (12) 
(10) Patent No.: US 10,191,171 B2
(45) Date of Patent: Jan. 29, 2019

(54) VARIABLE BUOYANCY CONTROL AND RECOVERY SYSTEM FOR SEISMIC DATA ACQUISITION

(71) Applicant: ION GEOPHYSICAL CORPORATION, Houston, TX (US)

(72) Inventor: André W. Olivier, River Ridge, LA (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 15/443,546

(22) Filed: Feb. 27, 2017

(65) Prior Publication Data

US 2017/0248722 A1  Aug. 31, 2017

Related U.S. Application Data

(60) Provisional application No. 62/300,408, filed on Feb. 26, 2016.

(51) Int. Cl.
| | |
|---|---|
| *G01V 1/38* | (2006.01) |
| *G01V 1/20* | (2006.01) |
| *B63B 21/66* | (2006.01) |
| *B63G 8/22* | (2006.01) |
| *B63G 8/42* | (2006.01) |

(52) U.S. Cl.
CPC ............ *G01V 1/3817* (2013.01); *G01V 1/201* (2013.01); *G01V 1/3808* (2013.01); *B63B 21/66* (2013.01); *B63G 8/22* (2013.01); *B63G 8/42* (2013.01); *G01V 1/38* (2013.01); *G01V 2001/207* (2013.01)

(58) Field of Classification Search
CPC .... G01V 1/201; G01V 1/3808; G01V 1/3817; G01V 2001/207; G01V 1/38; B63B 22/18; B63B 21/66; B63G 8/24; B63G 8/207; B63G 8/22; B63G 8/42
USPC .......................................................... 367/18
See application file for complete search history.

(56) References Cited

U.S. PATENT DOCUMENTS

| | | | |
|---|---|---|---|
| 3,595,257 A * | 7/1971 | McMahon | H01B 7/045 137/1 |
| 3,794,965 A | 2/1974 | Charske | |
| 4,745,583 A | 5/1988 | Motal | |
| 4,853,990 A | 8/1989 | Elder et al. | |

(Continued)

OTHER PUBLICATIONS

International Search Report and Written Opinion dated Jun. 14, 2017 in connection with International Patent Application No. PCT/US2017/019671, 12 pages.

(Continued)

*Primary Examiner* — Daniel L Murphy
(74) *Attorney, Agent, or Firm* — Dorsey & Whitney LLP (57) ABSTRACT

A seismic apparatus includes one or more seismic cable systems configured to acquire seismic data, each seismic cable system having one or more of a cable jacket, a reservoir for a ballast fluid or other ballast medium, and an actuator or other transfer mechanism configured to transfer the ballast fluid between the reservoir and the seismic cable system during acquisition of the seismic data, e.g., where the ballast fluid is transferred to the seismic cable system within the cable jacket. A controller can be configured to adjust a buoyancy of the seismic cable system responsive to the transfer of the ballast fluid, e.g., where the internal volume expands or contract based on the fluid transfer.

22 Claims, 8 Drawing Sheets

(56) References Cited

U.S. PATENT DOCUMENTS

| | | | |
|---|---|---|---|
| 5,201,128 A | 4/1993 | Olivier et al. | |
| 5,214,612 A | 5/1993 | Olivier et al. | |
| 5,284,323 A * | 2/1994 | Pawkett | B63B 21/66 |
| | | | 254/134.3 SC |
| 5,378,864 A | 1/1995 | Olivier et al. | |
| 5,418,757 A | 5/1995 | Rau et al. | |
| 5,507,243 A | 3/1996 | Williams, Jr. | |
| 6,263,823 B1 | 7/2001 | Olivier | |
| 6,292,436 B1 | 9/2001 | Rau et al. | |
| 6,397,773 B2 | 6/2002 | Olivier | |
| 6,525,992 B1 | 2/2003 | Olivier et al. | |
| 6,533,627 B1 | 3/2003 | Ambs | |
| 7,092,315 B2 | 8/2006 | Olivier | |
| 7,423,929 B1 | 9/2008 | Olivier | |
| 7,469,653 B2 | 12/2008 | Olivier et al. | |
| 7,623,411 B2 | 11/2009 | Faucheaux et al. | |
| 7,793,606 B2 | 9/2010 | Olivier et al. | |
| 8,348,543 B2 | 1/2013 | Olivier | |
| 8,446,797 B2 | 5/2013 | Olivier et al. | |
| 8,730,766 B2 | 5/2014 | Lambert | |
| 8,926,222 B2 | 1/2015 | Stenzel et al. | |
| 8,982,662 B2 | 3/2015 | Rouquette et al. | |
| 9,081,120 B2 | 7/2015 | Olivier | |
| 9,261,618 B2 | 2/2016 | Stenzel et al. | |
| 2001/0054373 A1 | 12/2001 | Olivier | |
| 2004/0008579 A1 | 1/2004 | Olivier et al. | |
| 2005/0276161 A1 | 12/2005 | Olivier | |
| 2007/0258321 A1 | 11/2007 | Tenghamn | |
| 2008/0181717 A1 | 7/2008 | Olivier et al. | |
| 2008/0212406 A1 | 9/2008 | Olivier | |
| 2008/0291778 A1 | 11/2008 | Caucheaux, Jr. et al. | |
| 2009/0211509 A1 | 8/2009 | Olivier et al. | |
| 2010/0054860 A1 | 3/2010 | Thompson et al. | |
| 2010/0239367 A1 | 9/2010 | Olivier | |
| 2011/0005801 A1 | 1/2011 | Olivier et al. | |
| 2011/0182140 A1 | 7/2011 | Lambert et al. | |
| 2012/0057430 A1 | 3/2012 | Rouquette et al. | |
| 2012/0120759 A1 | 5/2012 | Le Page et al. | |
| 2013/0148473 A1 | 6/2013 | Olivier | |
| 2013/0183100 A1 | 7/2013 | Olivier | |
| 2014/0328138 A1 | 11/2014 | Lambert et al. | |
| 2015/0098302 A1 | 4/2015 | Olivier et al. | |
| 2015/0331126 A1 | 11/2015 | Lambert | |
| 2016/0033660 A1 | 2/2016 | Olivier et al. | |

OTHER PUBLICATIONS

ION Marine Imaging Systems Quick LatchBrochure, 2007, 1 page.
ION Marine Systems QuickCUFF Brochure, 2011, 1 page.
Kongsberg Maritime AUV Systems Brochure, Jun. 23, 2014, 16 pages.
Kongsberg Maritime AUV Systems Marine Research Applications Brochure, May 2015, 16 pages.
Kongsberg Maritime Seaglider Brochure, Feb. 2015, 13 pages.
Kongsberg Maritime Seaglider product specification Brochure, Jul. 2013, 2 pages.

* cited by examiner

VARIABLE BUOYANCY CONTROL AND RECOVERY SYSTEM FOR SEISMIC DATA ACQUISITION

CROSS-REFERENCE TO RELATED APPLICATION

This application claims priority to U.S. Provisional Application No. 62/300,408, filed Feb. 26, 2016, entitled VARIABLE BUOYANCY CONTROL AND RECOVERY SYSTEM FOR SEISMIC DATA ACQUISITION, which is incorporated by reference herein, in the entirety and for all purposes.

FIELD

This application relates generally to seismic data acquisition, and more specifically to buoyancy control and recovery for marine seismic data systems. Suitable applications include, but are not limited to, towed seismic streamer arrays, ocean-bottom cables, and arrays of autonomous seismic sensor nodes.

BACKGROUND

In marine seismic exploration, a cable, commonly referred to as a seismic streamer cable, is towed underwater by a surface vessel. Conventional marine seismic surveys generally involve towing one or more streamer cables with a seismic vessel, where each streamer comprises a plurality of receivers distributed along its length. Depending on example, suitable seismic receivers or seismic node devices can be deployed along a number of individual cables or node lines, which are spread out into an array behind the tow vessel.

In addition to towed seismic survey applications, seismic receivers and nodes can also be deployed in an array of ocean bottom cables, suspended at a particular depth above the seafloor (or below the ocean surface), or deployed as an array of autonomous seismic sensor stations. Suitable seismic systems for use in such applications include, but are not limited to, those described in U.S. Publication No. 2015/0098302 to Olivier et al. (application Ser. No. 14/498,341), entitled SEISMIC SENSOR, and U.S. Publication No. 2015/0331126 to Lambert et al. (application Ser. No. 14/710,373), entitled OCEAN BOTTOM SYSTEM, each of which is incorporated by reference herein, in the entirety and for all purposes. Other suitable seismic systems are described in U.S. Pat. No. 8,730,766 to Lambert et al., entitled SEISMIC SYSTEM WITH GHOST AND MOTION REJECTION, U.S. Pat. No. 9,081,120 to Olivier, entitled APPARATUS AND METHOD FOR LOW-TENSION RETRIEVAL OF INSTRUMENTED MARINE CABLES, and U.S. Publication No. 2016/0033660 to Olivier et al. (application Ser. No. 14/774,544), entitled INTERNAL BEND RESTRICTOR FOR OPTO/ELECTRICAL ARMORED CABLES, each of which is also incorporated by reference herein, in the entirety and for all purposes.

Each seismic receiver or node may include, for example, a pressure sensor and/or a particle motion sensor in proximity to one another. The pressure sensor may be configured, for example, as a hydrophone that records scalar pressure measurements of a seismic wavefield in the surrounding water column or other seismic medium. The motion sensor may be configured, for example, as an accelerometer configured to sense linear or rotational motion (or both), e.g., with respect to one or more independent axes. In addition, positioning and navigation equipment may also be incorporated within or attached externally to the streamer cables or nodes, providing active means of controlling depth and lateral offset.

In operation of such a system in a seismic survey, an acoustic source is fired which generates an impulse of compressed air, creating an air bubble in the water column. The collapse of the bubble generates acoustic pulses that radiate through the water, propagating through the surrounding seismic medium and penetrating and into the earth below. By analyzing the reflected seismic wavefield detected by the receiver(s) or node(s) during the survey, geophysical data pertaining to reflected signals can be acquired and these signals may be used to form an image indicating the composition and subsurface structure of the Earth near the survey location.

In order to generate a high resolution images of the subsurface structure, with reduced distortion or substantially free of distortion, the seismic system may incorporate or provide one or more of (1) precise knowledge of source to receiver timing, (2) precise source to receiver geometry, and (3) broadband acoustic sensors having high signal to noise performance. To address these three survey considerations, the network of receivers may be positioned on a common plane, and deviations from the plane may have an impact on image quality—sometimes, the effect on image quality may be disadvantageous or deleterious. Thus, there remains a need for improved trim control and positioning capabilities that overcome the limitations of existing technologies, including, but not limited to, the known programmability limitations of current streamer recovery device (SRD) systems and related product offerings.

SUMMARY

Variable-buoyancy control and recovery systems are provided for use in seismic data acquisition. Exemplary applications include devices for changing the ballast condition, buoyancy, or specific gravity of a seismic cable during seismic data acquisition, and corresponding systems methods of operation. These systems and methods can incorporate buoyancy devices or modules configured for changing the volume of a seismic cable by injecting a fluid (e.g., a liquid or gaseous medium) into the cable during seismic data acquisition. For example, a buoyancy module may operate by transferring the fluid or other ballast medium from a storage vessel mounted serially and concentrically on the seismic cable and into a core volume of the seismic streamer, within the outer jacket, during seismic data acquisition. Suitable systems also encompass networks of such modules, capable of peer-to-peer communication in the event of cable failure or loss of signal connection.

Exemplary systems can be configured for transferring the fluid or ballast medium from a storage vessel mounted coaxially on the seismic cable and into the seismic streamer during seismic data acquisition. Pressure or depth sensors can be included, along with a transfer mechanism for transferring the fluid or ballast medium between the vessel and the interior of the seismic cable. Suitable systems can also be configured to communicate with a shipboard trim control system processor, e.g., inductively or acoustically via a wireless interface, or via a direct or indirect electrical interface connection to an external or on-board navigational control system.

Depending on application, the injected fluid or ballast medium can be restricted along the length of cable; e.g., limited to a particular longitudinal or radial position, or both.

Monitor systems can also be provided to monitor and control a plurality of such ballast or buoyancy control modules, e.g., during real-time seismic data acquisition with a towed seismic streamer or other seismic receiver array.

The buoyancy control devices (or ballast modules) can be mounted coaxially, unlike existing product offerings, and can be stored on a seismic winch while still coupled or mounted to the cable. Techniques are provided to extract the fluid or ballast medium from the streamer or cable, and return the streamer system or receiver array to service. For example, the ballast medium or other buoyancy control fluid can be extracted from within the streamer cable or jacket, e.g. for storage, and the ballast module can be recharged so the equipment can be returned to service, e.g., prior to deployment.

A monitor system is also encompassed, in order to make intelligent decisions regarding which of a plurality of such modules should be activated during operation, e.g., via shipboard or autonomous command. Thus, the monitor system can be operated to maintain depth and trim control before, during or after seismic data acquisition, or any combination thereof.

DETAILED DESCRIPTION

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides advantages over the prior art. Although some embodiments of the invention may achieve advantages over other possible solutions in the prior art, whether or not a particular advantage is achieved does not limit the invention to any particular embodiment. Thus, the following aspects, features, embodiments and advantages are merely illustrative, and are not considered elements or limitations of the appended claims except where explicitly recited. Likewise, reference to "the invention" shall not be construed as a generalization of any inventive subject matter disclosed herein, and the various features that are described shall not be considered to be an element or limitation of the appended claims except where expressly stated.

Figure 1A:
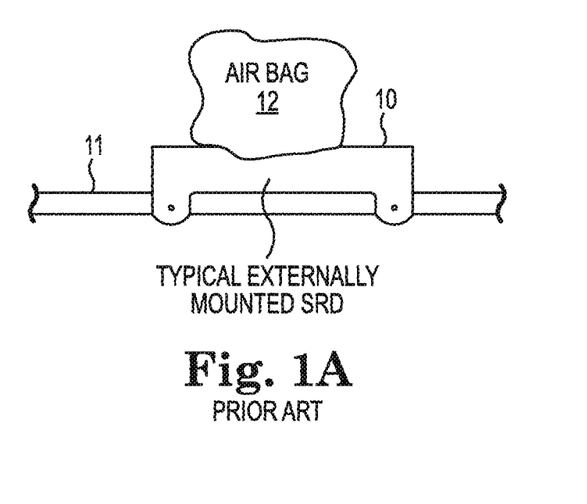
FIG. 1A is an illustration of an externally-mounted streamer recovery device.

FIG. 1A is an illustration of an externally-mounted stream recovery device (or SRD) 10, e.g., as known in the prior art. As shown in FIG. 1A, SRD 10 is externally mounted to streamer 11, in an asymmetric, non-conforming and non-coaxial relationship. The "air bag" or other flotation component 12 is configured for external deployment, e.g., outside the outer diameter of the cable jacket, in order to bring streamer 11 to the surface for recovery.

In cases where oil-filled ballasted cables experience structural failure, environmental damage may occur. Insurance providers may thus require seismic contractors to incorporate one or more floatation safety devices 10 along the length of each streamer 11, which, when activated, may provide positive ballast and float the streamer (or other cable section) 11 to the surface. These devices, commonly known as streamer recovery devices, are often mounted externally to the streamer 11, and typically designed to function autonomously. Each SRD 10, for example, prior to deployment, may be programmed to open a valve which inflates air bag 12 at a preset pressure or depth.

Existing SRD systems 10 can also impact natural cable motion through the water, and may be a potential source of entanglement or create flow and vibration noise. A relatively large air bag or similar external flotation component 12 may also be required in order to recover streamer 11, as devices 10 are only located at discrete locations along the cable 11. Once the external component 12 is inflated, moreover, continuing to tow the cable 11 can result in structural damage. Further, users cannot always monitor the status of individual devices 10, nor change the set depth or activation state, in real time during seismic data acquisition.

Occasionally SRDs 10 may also trigger unnecessarily, causing streamers 11 to surface and interrupt production, or SRDs 10 may fail to fire during cable accidents, preventing the opportunity for recovery. Occasionally, conditions such as high sea states or marine traffic may also require seismic operators to tow streamers below the respective SRD set depths, in order to avoid cable damage. Without remote capability to safeguard individual SRDs 10, or to change the firing depth, the SRDs 10 may fire and unintentionally jeopardize equipment, including, but not limited to, the streamers or other cable sections 11. There is thus a need for more advanced streamer recovery systems, which do not share these same limitations. Such systems may also be adapted for real-time buoyancy control during seismic data acquisition, and can be configured for ocean-bottom cables and autonomous node arrays, as described herein.

Figure 1B:
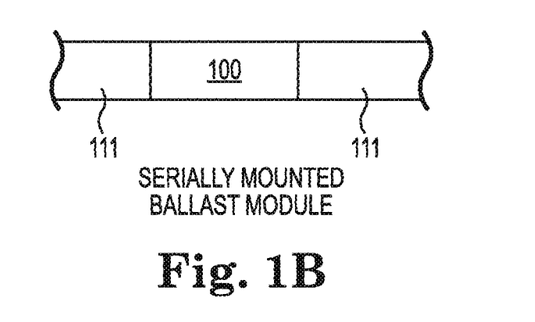
FIG. 1B is an illustration of an in-line, coaxially-mounted buoyancy control device or ballast module.

FIG. 1B is an illustration of an in-line or coaxially-mounted buoyancy control device (or ballast module) 100. In one particular embodiment, ballast module 100 can be integrated within or replace an existing cable interface module for streamer 111. Alternatively, module 100 can be configured as an in-line replacement for an external (prior art) SRD appliance, e.g., as shown in FIG. 1A.

As shown in FIG. 1B, ballast module 100 is serially and concentrically connected between opposing sections of streamer cable 111. In lieu of the typical (prior art) external air ballast bag of FIG. 1A, ballast module 100, when activated, injects a ballast medium directly into the streamer cable 111, in order to inflate the jacket diameter. Because the streamer is sealed, introducing additional volume can replace or eliminate the requirement for towing externally mounted flotation components. This approach also provides for consistent specific gravity modulation along the entire length of each streamer section 111, without introducing localized ballast perturbations. The elimination of large structural air bags and mounting equipment also enables winch storage of the cable together with the floatation devices, lowers external entanglement risks, reduces streamer noise, and provides for shipboard status monitoring and firing depth instructions, as described herein.

Figure 2A:
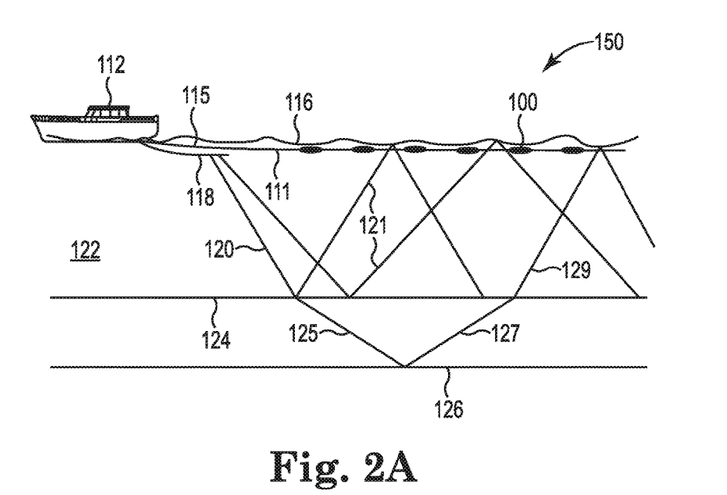
FIG. 2A is an illustration of a towed seismic streamer.

FIG. 2A is an illustration of a representative towed seismic streamer array 150. As shown in FIG. 2A, a seismic vessel 112 tows a number of seismic streamer cables 111, for example using a lead-in or tow line 115 for each streamer 111. Streamers 111 are suspended at or below the ocean surface 116, or in another body of water, e.g., utilizing one or more ballast modules 100 for real-time buoyancy control and recovery.

Vessel 112 can also be configured to tow an array of air guns or similar seismic sources 118 configured to emit energy in the form of acoustic waves 120. The acoustic energy or waves 120 propagates through water column 122 toward the seabed 124, or other underwater structure. A portion 121 of the acoustic energy 120 emitted by sources 118 reflects from seabed 124, and may undergo multiple reflections between seabed 124 and surface 116. Another portion 125 of the acoustic energy 120 penetrates through seabed 124, and propagates down to the underlying subsurface or substructure 126, for example to a hydrocarbon reservoir or other resource located below the ocean floor or other bottom surface 124 of water column 122.

Figure 2B:
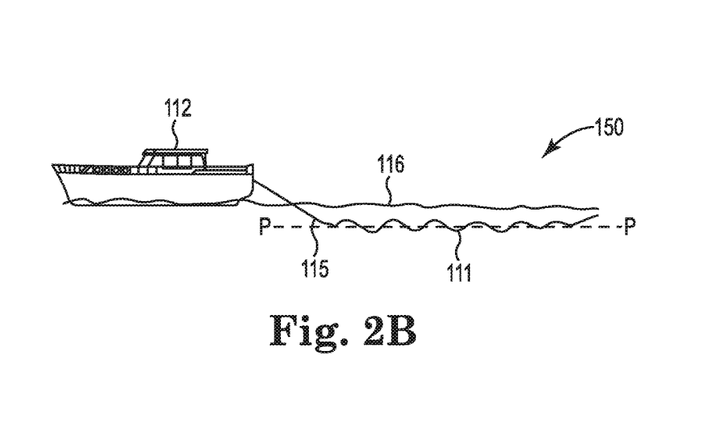
FIG. 2B shows a seismic streamer under a non-uniform ballast conditions.

A fraction 127 of the transmitted acoustic energy 125 reflects from subsurface structures 126, and refracts at seabed 124 to generate returning acoustic waves 129, which pass back up through water column 122 toward surface 116 (additional reflections may also occur, at each interface). As shown in FIG. 2B, the returning acoustic energy 129 can be captured by seismic receivers in towed streamers or node lines 111, in order to generate seismic data (or traces) that are processed to produce seismic images and other geophysical survey information. The images and other survey information can be used to describe the reservoir or other subsurface structures 126 below water column 122 and seabed 124.

Towed seismic cables 111 are typically filled with ballast media such as substantially incompressible oils, polyurethane gels and syntactic or semi-rigid foams, which are selected to match the density of water column 122 and to help maintain cables 111 in a relatively flat image plane with respect to surface 116, when towed by vessel 112. Cables 111 may also incorporate rigid oil block spacers, and external ports for injecting the ballast media. Hybrid streamer systems 111 are also known, e.g., with syntactic foam in the proximity of the hydrophones or other seismic receivers, and compliant ballast gel on each end of the cable for fine tuning the cable buoyancy (or specific gravity), and to facilitate electrical and fiber optic connections.

The water density varies significantly with salinity and temperature, for example from high latitude artic regions to equatorial waters, resulting in variable streamer ballast requirements. Marine growth in warmer regions can also change the specific gravity of water column 120, for example in warmer waters, and the pressure, density, tow speed and streamer configuration can also vary during any particular seismic survey, requiring reconfiguration of the ballast state along each streamer cable 111.

Seismic operators have thus traditionally used a combination of external ballast weights and control devices (or "birds") to maintain the flatness of the streamers 111 in array 150. While external weights may adequately ballast the cable at discrete locations, however, variations in the specific gravity along cable 111 can result in a scalloped or catenary geometry between the individual control devices, as shown in FIG. 2B.

FIG. 2B is an illustration of a towed streamer array 150 with ballast or buoyancy variations exhibited along the length of an individual streamer cable 111. The resulting non-uniform depth profile of cable 111 along image plane P, as compared to surface 116, can be a significant noise source for low frequency (e.g., near unity) acoustic wavefields, which are required to suitably image deep, hydrocarbon rich sediments and other relevant subsurface structures. The control devices themselves can also result in increased flow noise, and contribute to cable vibrations.

Techniques for more continuous in-line, dynamic ballasting can offer significant enhancements in seismic image quality and survey productivity, without requiring external appliances or other non-conforming structures along the length of streamer cable 111. Precisely controlling the specific gravity or buoyancy along the length of each streamer cable 111 to match the variable density of water column 122 limits deviation from image plane P, reducing noise and improving seismic image reconstruction for relevant subsurface structures 126.

Figure 3A:
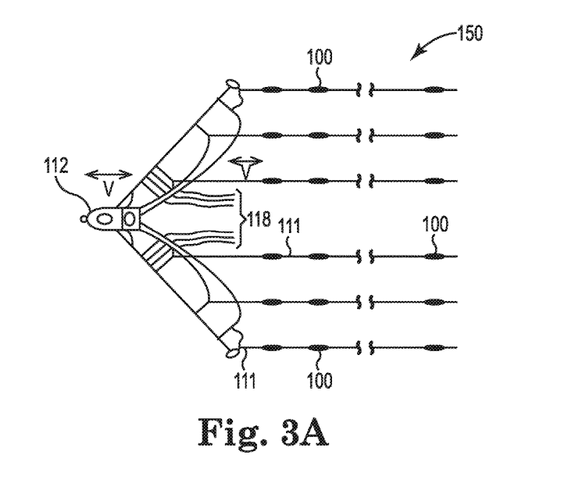
FIG. 3A is an illustration of a representative towed seismic array with a plurality of streamer cables.

FIG. 3A is schematic illustration of a representative towed seismic array 150. In this example, array 150 includes a plurality of streamer cables 111 and seismic sources 118 towed behind vessel 112. Advanced streamer recovery and buoyancy control are provided by distributing one or more ballast modules 100 along each streamer cable 111.

Production seismic streamers and towed nodes are complex systems, each of which can include thousands of sensors distributed along the cable at the receiver or node locations, as well as associated navigation and positioning equipment. A typical streamer cable or rope may be up to 10 km long, and cost millions of (U.S.) dollars, fully equipped. Seismic contractors may tow as many as eighteen or more such streamers at a time, with a substantial in-water financial investment on the order of tens of millions of dollars.

In addition to ballasting considerations, variations in the tow velocity (indicated by "V" below the double arrows in the figure) can also propagate along individual streamer cables 111, including changes due to speed, direction, cross-currents, yaw, and other navigational considerations. Accidents can also occur as a result of entanglement, cable failure and vessel overrun, resulting in significant potential losses of capital equipment and production opportunity. Ballast modules 100 address these concerns by providing more advanced buoyancy control and recovery options, increasing seismic survey efficiency and reducing the risk of catastrophic streamer loss.

Figure 3B:
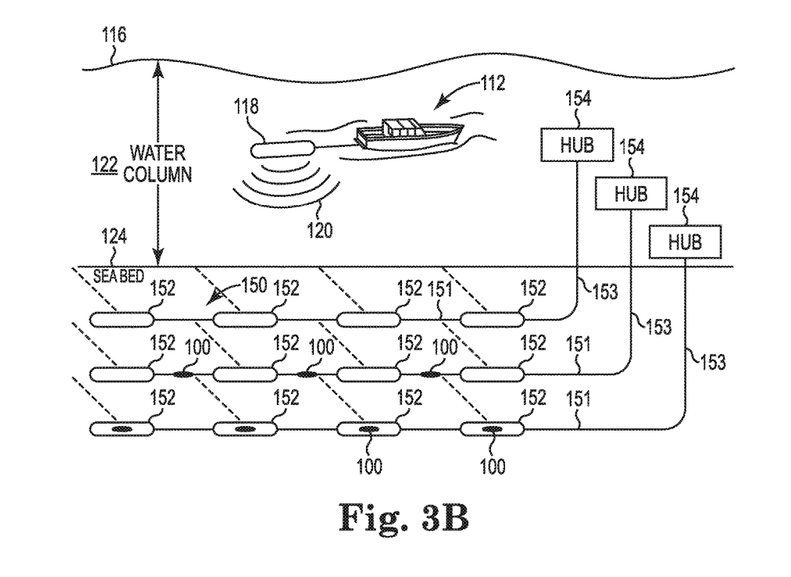
FIG. 3B is an illustration of a representative seismic array, in an ocean-bottom cable or autonomous node embodiment.

FIG. 3B is a representative seismic array 150, in an ocean-bottom cable or autonomous node embodiment. As shown in FIG. 3B, vessel 112 is configured to tow an air gun array or other seismic source 118 below surface 116 of water column 122. Source 118 emits acoustic energy 120 into water column 122, in order to perform a seismic survey of the subsurface region beneath seabed 124, using an ocean-bottom seismic array 150.

Air gun sources 118 are configured to release compressed air into water column 122, generating energy in the form of acoustic waves 120 that propagate toward seabed 124. A fraction of the acoustic energy penetrates through the ocean floor or other bottom feature beneath water column 122, and reflects from the underlying subsurface structures. The acoustic energy reflected from the sub-surface structures can be detected in the form of seismic traces or other seismic data, and recorded by an array 150 of seismic receivers or sensor nodes 152. The seismic data can then be processed to generate an image of subsurface structures beneath the ocean floor or seabed 124, or beneath a lake, river, reservoir, or other water column 122. The images and other geophysical information can then be analyzed in order to identify structures of interest, as described above, including, but not limited to, structures indicating the presence of hydrocarbon resources and other natural resources.

As shown in FIG. 3B, a plurality of seismic receivers or sensor nodes 152 are placed in a grid pattern (dashed lines) or other configuration on seabed 124, for example as deployed along one or more ropes or ocean-bottom cable (OBC) assemblies 151.

Ballast modules 100 can be provided along individual sections of the seismic rope or cable 151, or provided within one or more individual nodes 152. Each receiver or node 152 can also include one or more of a hydrophone, geophone or other suitable sensor components, e.g., configured to detect acoustic or seismic energy reflected from structures beneath seabed 124. Cables 151 can provide data, power and communication links between individual receivers or nodes 152, with additional power and communications links 153 to respective hub devices 154, e.g., on the surface 116, or suspended within water column 122 at a selected depth.

Hub devices 154 can include power supplies and computer processing components configured to acquire and store seismic data collected by nodes or receivers 152, with high precision clock and control circuitry to provide corresponding timing and data acquisition signals. Suitable hub devices 154 can also be deployed on seabed 124, suspended at a predetermined height above seabed 124, or submerged at a selected depth below surface 116.

Alternatively, individual seismic receivers 152 can also be configured as autonomous sensor nodes, with independent power, sensor, and data acquisition components. Depending upon application, strings of autonomous nodes 152 can be deployed from a surface vessel along one or more ropes or cables 151, or configured for individual deployment and recovery using an autonomous navigation system or underwater autonomous vessel (UAV).

Suitable arrays 150 of receivers or nodes 152 can also be suspended at a predetermined height above seabed 124, or submerged at a selected depth below surface 116, e.g., using a real-time buoyancy control system based on one or more ballast modules 100. Suitable buoyancy control devices 100 can also be utilized for recovery of ocean bottom cable systems 151 and individual nodes 152, as described herein.

Figure 4A:
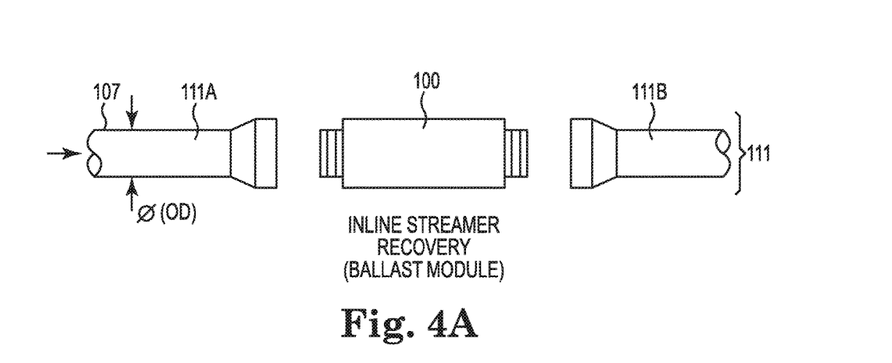
FIG. 4A is a schematic diagram of an in-line buoyancy control device for a streamer or ocean-bottom cable.
Figure 4B:
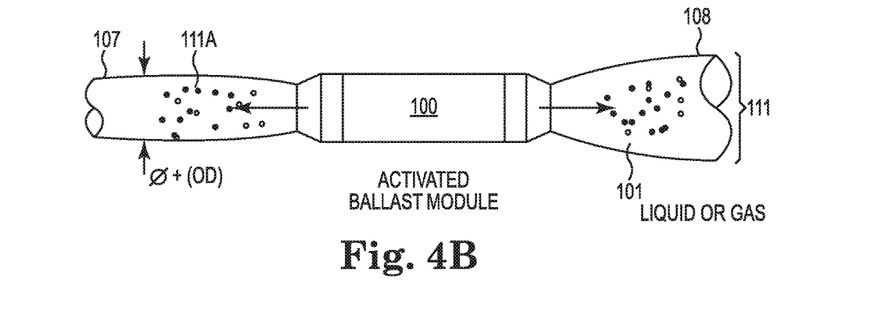
FIG. 4B is a schematic illustration showing the device in a deployed state configured to provide positive cable buoyancy.

FIG. 4A is a schematic illustration of an in-line buoyancy control system or ballast module 100 for a streamer or ocean-bottom cable system 111. Cable system 111 includes a number of individual cable or rope segments 111A and 111B, coupled together in series with one or more ballast modules 100 having axial couplings 100A and 100B configured for in-line coupling to cable or rope segments 111A and 111B, respectively. FIG. 4B is a schematic illustration of module 100 in a deployed state, e.g., as configured expand the outer diameter (OD) of cable jacket 107 to provide positive buoyancy control for cable system 111.

As shown in FIGS. 4A and 4B, ballast module 100 can be integrated within an existing cable interface module, or configured to replace such an interface or coupling device. In particular embodiments, ballast module 100 can be configured as an in-line replacement module for an external SRD appliance, and may incorporate both buoyancy control components for changing the specify gravity or buoyancy of the adjacent cable sections 111A and/or 111B, and streamer cable interface components for power, data and control communications between adjacent cable sections 111A and 111B.

In contrast to existing SRD designs, ballast module 100 can be serially and coaxially or concentrically connected between first and second adjacent sections 111A and 111B of a streamer or other seismic cable system 111. In lieu of the typical external air ballast bag or other externally-deployed components, ballast module 100, when activated or operated, can inject a fluid or other ballast medium 101 directly into the core of cable sections 111A and/or 111B, inside the cable skin or jacket 107, in order inflate the OD.

Thus, the buoyancy is responsive to the transfer of the ballast fluid or other medium between the reservoir and the internal or core volume of the adjacent streamer cable sections 111A and 111B, as defined within the respective outer jacket 107. More specifically, the buoyancy may be responsive to changes in the internal core volume, e.g., where the OD of the cable jacket 107 expands or contracts in response to the fluid transfer.

As the streamer jacket 107 is sealed, introducing additional ballast material 101 can reduce or eliminate a requirement for towing air bags or other externally mounted buoyancy or ballast components. This approach also provides for consistent specific gravity modulation along the entire length of each streamer or cable section 111A, 111B, in contrast to using discrete components which can introduce localized ballast perturbations. The elimination of larger, external air bag structures and associated mounting equipment also enables winch storage, lowers the number of components subject to external entanglement, reduces streamer cable noise, and provides for shipboard status monitoring and firing depth instructions for an integrated cable buoyancy control system utilizing multiple ballast modules 100.

Figure 5:
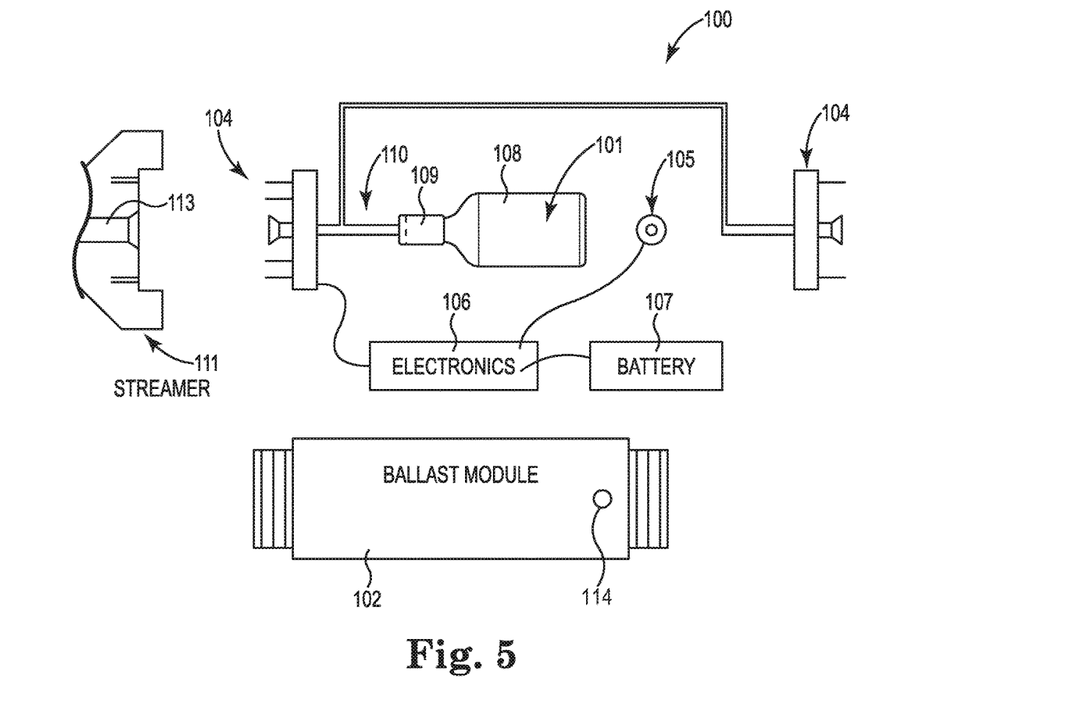
FIG. 5 is a disassembled view of a representative ballast module.

FIG. 5 is a disassembled view of a representative ballast module or buoyancy control device 100. As shown in FIG. 5, module 100 is housed in a cylindrical vessel or housing 102 configured to accommodate various electrical connection interfaces 104 for communication between adjacent streamers or cable sections 111, along with other components of an internal electronics package or controller 106.

Seismic streamers or cable sections 111 may typically be up to 75 to 100 meters long, or more or less, with mechanical and electrical connectors at both ends. Individual cable sections 111 are typically serially connected with telemetry or positioning modules every approximately 150 to 400 meters, or more or less. Some suitable embodiments would include a ballast module 100 housed in a metal (e.g., titanium) cylindrical vessel or other housing 102, installed at connection locations which do not necessarily require other telemetry or positioning module devices.

Electronics package 106 is configured to control the transfer of ballast medium 101 between the pressure vessel or reservoir 108 and adjacent cable sections 111. For in-line applications, package 106 may include one or more wireless, acoustic, inductive, or electrical interfaces 104, with which a cable telemetry system can be provided for data, control and/or power communications between adjacent cable sections 111, and between the modular buoyancy systems 100 and an external trim control processor system. Pressure or depth measurement components can also be provided, for example a pressure sensor 105 mounted internally within housing 102, in pressure communication with the external water column, which can be configured to provide for controlling the fluid transfer mechanism by sensing the pressure of the water column via an external port 114. The transfer of ballast medium 101 into cable sections 101 can be triggered by a valve, pump or similar flow control component, either at the preselected recovery depth or in response to a recovery command signal, or to provide real-time trim ballast control along the length of one or more seismic cable sections 111.

Battery pack 107 can be provided in the event of a power failure, e.g., as adapted for activating the ballast transfer mechanism or mechanisms of the ballast control module 100. A pressure vessel 108 contains sufficient compressed gas or other fluid ballast medium to inflate or expand the streamer skin, increasing the outer diameter to positively adjust the cable buoyancy by increasing the volume of cable system 111, reducing the effective specific gravity. An inert gas such as argon, carbon dioxide, nitrogen or another compressible gas can be used for the ballast medium, or oils and other less compressible fluids can be used. As minor changes in the streamer volume result in significant ballast changes, relatively small quantities of the ballast fluid may be utilized to change the overall cable system from negative or neutral buoyancy, e.g., where the effective specific gravity of the cable system is greater than or equal to that of the surrounding water column, to a positive buoyancy state, e.g., with effective specific gravity less than that of the water column.

In some embodiments, housing 102 of ballast module 100 can be configured as the pressure vessel for ballast medium 101, eliminating the requirement for a second (internal) pressure vessel 108. Depending on application, the ballast transfer mechanism may include a high pressure valve and/or rupture disk mechanism 109 in flow communication with a fluid coupling 110, thru which ballast medium 101 is transferred internally from pressure vessel 108 and/or from within pressure housing 102 to the interior of one or more adjacent streamers 111.

At each end of adjacent/opposing streamers or cable segments 111, a check valve, rupture disk or similar complementary (e.g., in-line fluid) coupling 113 can also be installed, in order to transfer ballast medium 101 from reservoir 108 and/or via the fluid coupling or conduit 110 of ballast module 100 into the core of the adjacent cable section 111. Once ballast module 100 is activated, either manually via ship board command or automatically (e.g., based on a pressure or depth signal, peer-to-peer communications, or using an external trim control signal), ballast medium 101 is then injected axially or longitudinally through fluid coupling or port 113 into the core portion of one or both adjacent streamer/cable sections 111.

In some embodiments the ballast medium (e.g., a gas or other fluid) freely propagates along the length of each adjacent cable section 111, within the streamer jacket, and can permeate the entire length of each adjacent streamer. The positively ballasted cables then surface, and can be recovered.

Alternatively, ballast medium 111 may occupy the radial space between the jacket and a syntactic foam core, or other substantially impervious core material. Impervious baffles or similar materials can also be provided to limit the longitudinal propagation of ballast medium 101 along the axial extent of adjacent cable sections 101. Ballast module 100 can also be configure to inject only a portion of the available ballast medium 101, or to exchange selected quantities of ballast medium 101 between vessel 108 or module housing 102 and the adjacent streamer or cable systems 111, in order to provide positively trim control and buoyancy adjustment during seismic survey operations, as described herein.

Figure 6A:
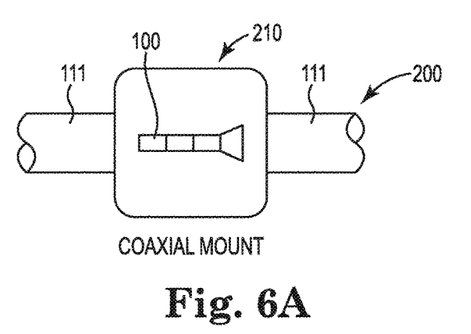
FIG. 6A is a side view of a coaxially mounted ballast module.
Figure 6B:
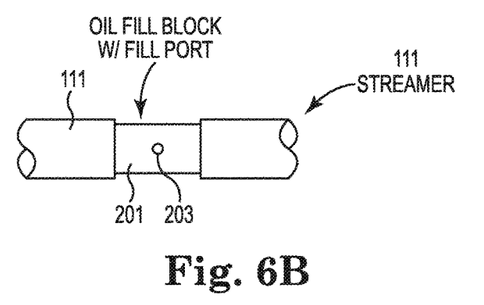
FIG. 6B is a detail view of the mounting configuration in FIG. 6A, showing an internal oil filler block.

FIG. 6A is a side view of a coaxially mounted ballast module system 200. FIG. 6B is a detail (internal) view of the mounting configuration, showing an internal oil filler block 201 about which module 200 can be mounted.

As shown in FIG. 6A, ballast module system 200 can be rigidly mounted coaxially on a streamer or cable segment 111, for example with a ballast device 100 disposed within one or more modular housing components 210 coaxially disposed on or about an oil filler block 201 or other internal component installed in one or more oil and/or gel filled cables 111, as shown in FIG. 6B. Alternatively, such a module 200 can be installed on an ocean-bottom cable or other seismic cable system, as described above.

Coaxially-mounted embodiments of the ballast system 200 or module 100 can be advantageously compatible with existing streamer and cable designs, and can also provide an option for additional cable topologies which do not require a vacant in-line coupling position for each ballast system 200 or module 100. An internal ballast medium storage vessel and injection mechanism can also be implemented (e.g., similar to the embodiment of FIG. 5), and the existing oil block spacer injection plug (or other fluid coupling device) can be replaced with a one-way valve or rupture disk 203, configured for injection of the ballast medium into oil block 201 or other internal component, and/or along the length of the adjacent streamers or cable sections 111.

Figure 6C:
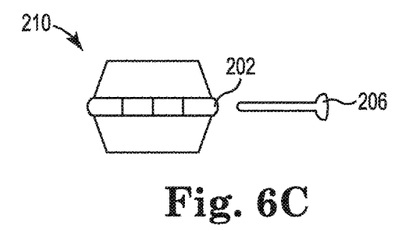
FIG. 6C is a side view of a representative coupling collar for the coaxially mounted ballast module of FIG. 6A.
Figure 6D:
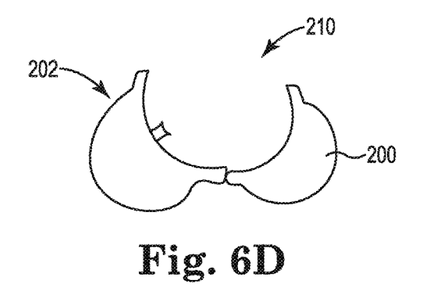
FIG. 6D is an end view of the coupling collar of FIG. 6C, in an open position.

FIG. 6C is a side view of a modular housing 210 with a quick release collar 202 for coaxially coupling the ballast system or module 200 to a streamer or cable section, e.g., with a quick release pin or other coupling mechanism 206 for securing collar 202 about the ballast module 100 on a seismic cable. FIG. 6D is an end view of the modular housing 210 for a ballast module or system 200, showing coupling collar 202 in an open position. In this example, coupling module 200 may be integrated into the collar configuration, or provided as a separate component that is attached to the seismic cable system with collar 202, and housed within the modular housing 210.

Suitable configurations of coupling collar 202 for providing rapid and reliable methods to install and remove module 200 include, but are not limited to, QUICK LATCH and QUICKCUFF connector systems, as available from ION Geophysical Corporation of Houston, Tex. Other suitable coupling devices and techniques are described in U.S. Pat. No. 5,507,243 to Williams et al., CONNECTOR FOR UNDERWATER CABLES, and U.S. Pat. No. 6,263,823 to Olivier, CONNECTION SYSTEM FOR CONNECTING EQUIPMENT TO UNDERWATER CABLES, each of which is incorporated by reference herein, in the entirety and for all purposes.

Figure 7:
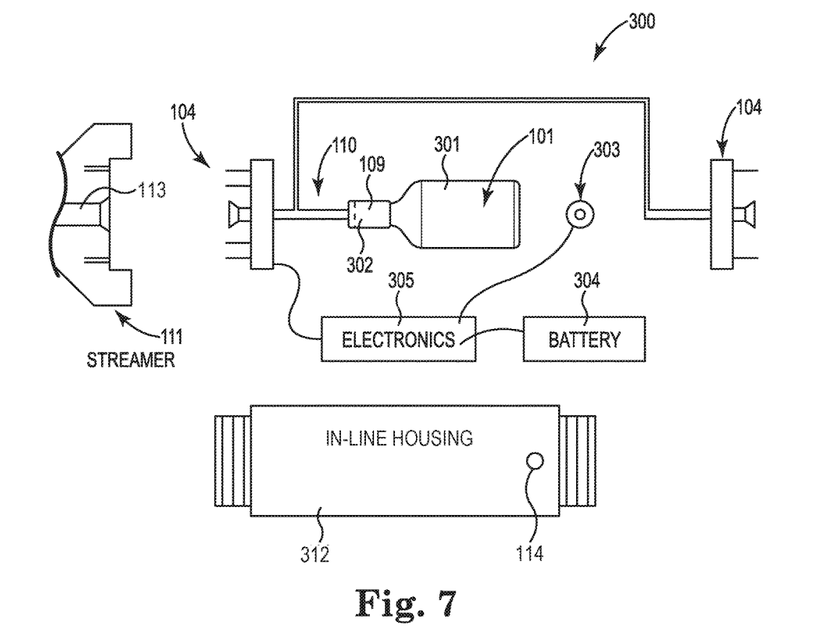
FIG. 7 is a disassembled view of an alternate ballast module, e.g., as configured to replace an existing cable section interface.

FIG. 7 is a disassembled view of an alternate ballast module 300, e.g., using a ballast module 100 or system 200 configured to replace an existing cable section interface or other in-line cable component within an in-line component housing 312. In one embodiment, the ballast module 300 can also be configured to provide real-time trim ballast corrections in response to variations in sea density and other navigational conditions, and to compensate for manufacturing variances along the length of individual streamers or other seismic cable systems 111. As a result, relative depth variations can be reduced along the length of the cable systems 111 in real time during the continued seismic data acquisition process.

As illustrated in FIG. 7, a ballast medium 101 can be transferred directly into streamer(s) 111 or the cable core via a fluid coupling or port 113, in order to inflate the streamer jacket and provide increased buoyancy by decreasing the effective specific gravity. Unlike other designs, however, ballast medium 101 may be specifically adapted to match the acoustic impedance of streamer 111. This contrasts with existing devices (e.g., on commercial remotely operated vehicles and sea gliders), which utilize slightly compressive oils having specific gravity slightly less than sea water. In addition, ballast module 300 can provide bi-directional service to increase or decrease the cable buoyancy by selectively exchanging ballast medium 101 between vessel or reservoir 301 and the body of the adjacent streamers or cable systems 111.

Suitable bi-directional ballast medium transfer service could include venting ballast medium 101 externally to the seawater (or other water column), e.g., provided an inert gas or other environmentally safe and compatible ballast medium 101 is used, and/or transferring the ballast medium 101 back to the internal reservoir or pressure vessel 108. The ballast medium 101 could also be extracted from the seismic cable system through a suitable port or venting mechanism after recovery, e.g., using a ship-board fluid handling system to remove the used ballast medium and to recharge the internal pressure vessel or reservoir 108.

A high pressure pump or other fluid transfer mechanism 302 and valve system 109 can be configured to transfer a selected amount of the oil or other ballast medium 101 into and out of cable system 111, which can function as a bladder or volume reservoir with variable outer diameter. Typically, the ballast fluid transfer required to trim cable system 111 under tow (e.g., to match the specific gravity of the surrounding water column) is only a fraction of that required to recover a failed streamer.

In trim ballast applications, module 300 can includes one or more of an oil-filled pressure vessel 301, a high pressure hydraulic pump 302 and valve system 109, a depth or external pressure sensor 303, a battery backup or other power supply 304, an electronics/control module 305 and a streamer filler port or similar fluid coupling 110. Shipboard instructions from an external trim control processor can be communicate using wired or wireless electronic interfaces to generate commands for module 300 to adjust the ballast condition and buoyancy of cable system 111 in real time, according depth or pressure commands issued before, during or after seismic data acquisition.

Trim ballast embodiments of buoyancy control device 300 reduce or eliminate requirements for externally air bags, weights, and other externally-mounted devices, and provide real-time control of the streamer volume and corresponding effective specific gravity of cable system 111. This approach also provides for more consistent, effective, real-time specific gravity modulation and buoyancy control along the entire length of each streamer section 111.

Small changes in the streamer outside diameter (OD) can result in substantial changes to the effective specific gravity and buoyancy, providing for significant ballast adjustments to reduce deviations from the imaging plane. The elimination or reduction of air bags, external floatation components, and associated mounting equipment can also reduce towed cable noise, enable direct winch storage, and lower the risk of external entanglements.

Figure 8:
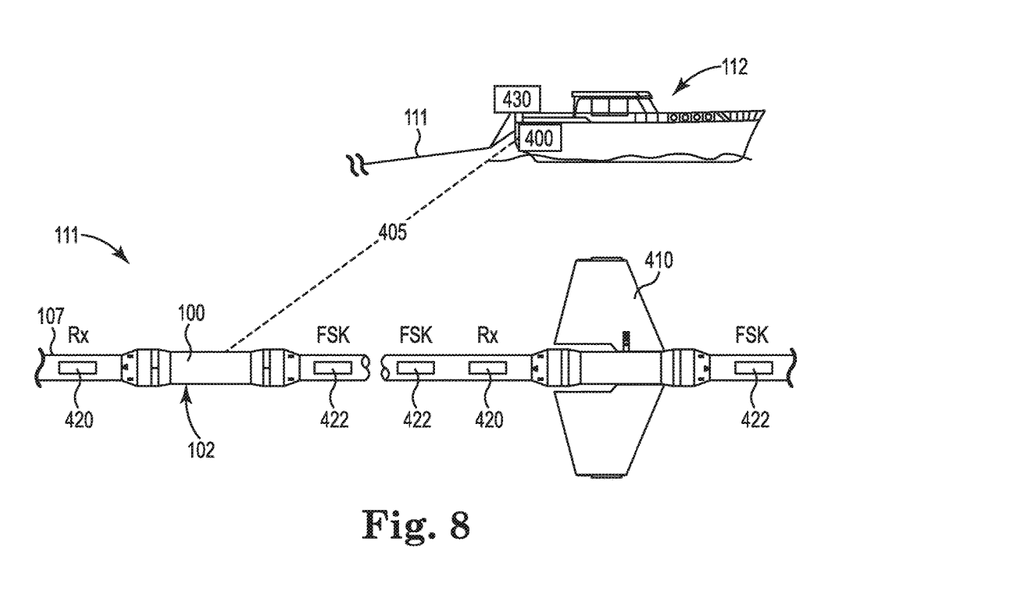
FIG. 8 is a schematic view of a trim control system for a ballast module network.

FIG. 8 is a schematic diagram of a vessel 112 with a trim ballast control and recovery system 400 for an array of seismic cables 111 with a network of ballast modules 100. As shown in the particular embodiment of FIG. 8, an external control system 400 can be provided on board surface seismic vessel 112, which is configured to tow an array of multiple streamer cables 111. System 400 is in communication with one or more ballast modules 100 disposed along cable 111, using a wired or wireless interface to provide for data and control communications 405 (dashed line). A winch type deployment and recovery system 430 can be provided on the deck of vessel 112 to deploy and recover the individual streamer cables 111, e.g., for storage on a drum, winch or similar component, including in-line or low-profile ballast modules 100 mounted between adjacent steamer sections 111. Deployment and recovery system 430 can also include a ballast recharging apparatus, e.g., configured to remove the ballast medium from streamer cables 111 as necessary, and to recharge the reservoirs in each ballast module 100, for returning cables 111 to service.

In particular examples, each streamer cable 111 can also be provided with one or more "birds" or similar streamer positioning devices 410, and may communicate with surface vessel 112 using suitable transmitter or receiver (Rx) systems 420 and telemetry modules 422 (e.g., with frequency-shift keying or FSK compatibility). Alternatively, any combination of wired, acoustic, wireless and/or inductive communications 405 can be used, as adapted for shipboard, hub, and/or UAV-based control systems 400, each providing global streamer ballast monitoring and real-time trim and recovery module control, for a range of corresponding streamer, ocean-bottom cable, and autonomous node-based seismic cable systems 111. Individual ballast modules 100 can also be configured for direct peer-to-peer communication, e.g., in order to provide a global trim control solution based on depth and position information from a network of ballast or buoyancy control modules 100, or for a global recovery signal based on a depth or external pressure signal from a selected number of individual buoyancy control modules 100.

System 400 can also be adapted for real-time updating of the corresponding streamer recovery firing depth instructions. Additional system hardware and software components can also be provided to monitor and control a plurality or network of ballast modules 100 and/or control devices 410 distributed along one or more streamer cables 111 or node lines 111 in a seismic array, in order to reduce or minimize cable scalloping and other deviations from the imaging plane, while reducing required bird density, wing angles and other control requirements. These techniques also allow for mixing cable models and reducing or eliminating external weights, and other external ballast components.

Ballast modules 100 are also provided with coaxial, hydrodynamic, and conforming configurations for module housing 102, in order to reduce streamer noise and improve storage options. In particular examples, housing 102 can be provided in substantial conformance with the nominal OD of cable jacket 107, for example with housing 102 disposed coaxially along cable 111 within the nominal OD of outer cable jacket 107, or within a nominal range (e.g., from 120% to 150%) of the nominal OD of outer cable jacket 107, as shown in FIG. 8. In these configurations, ballast modules 100 can readily be deployed, recovered and stored along with the streamers or other seismic cable systems 111, for example using a winch or drum for cable storage with the trim modules installed along the cable length, mounted between adjacent seismic cable sections between successive seismic data acquisition operations, as described above.

EXAMPLES

Representative apparatus embodiments can be provided comprising one or more seismic cable systems configured to acquire seismic data. The seismic cable systems can have one or more of a cable jacket; a reservoir for ballast fluid; a transfer mechanism configured to transfer the ballast fluid between the reservoir and the seismic cable system during acquisition of the seismic data, e.g., where ballast fluid is transferred to the seismic cable system within the cable jacket; and a controller configured to adjust a buoyancy of the seismic cable system responsive to the transfer of the ballast fluid.

In any of these examples and embodiments, the buoyancy of the seismic cable system can be responsive to expansion of the cable jacket upon transfer of the ballast fluid from the reservoir. Similarly, the fluid transfer mechanism can be configured to selectively transfer the ballast fluid along a length of the seismic cable system, e.g., with the buoyancy responsive to changes in a cross-sectional area of the cable jacket along the length.

The controller can be configured to trim the buoyancy along a length of the seismic cable system, e.g., by selectively transferring the ballast fluid during acquisition of the seismic data. The transfer mechanism may comprise a pump or valve configured to transfer the ballast fluid between the reservoir and a volume defined within an outer diameter of the cable jacket.

The ballast fluid can be selected to match an acoustic impedance of the cable jacket. An external water column pressure sensor can be provided, e.g., responsive to depth of the seismic cable system in the external water column proximate the pressure sensor. The reservoir may comprise a pressure vessel configured to release the ballast fluid into a volume defined within the cable jacket, e.g., responsive to the depth.

A modular housing can be disposed about the reservoir and the fluid transfer mechanism, e.g., where the modular housing is configured for mounting coaxially along the seismic cable system. First and second axial couplings can be configured for connecting the modular housing in-line between first and second adjacent sections of the seismic cable system, e.g., with an electronics module configured for data communication between the adjacent sections during acquisition of the seismic data.

An axial fluid coupling can be configured for transferring the ballast fluid from the reservoir into one or more of the adjacent sections seismic cable system, e.g., within an outer diameter of the cable jacket. The modular housing can be configured for coupling about the outer jacket of the seismic cable system, e.g., with one or more coupling collars disposed about an outer diameter of the cable and coupling the housing to the cable jacket, e.g. via a compressive engagement at one or both ends of the housing. A port can be configured for transferring the ballast fluid from the reservoir, e.g., through an outer diameter of the cable jacket.

Representative ballast module embodiments may comprise a housing adapted for mounting the ballast module along a seismic cable system configured for acquiring seismic data. A reservoir may be disposed within the housing, e.g., with the reservoir configured to transfer a ballast medium between the reservoir and a volume defined within an outer jacket of the seismic cable system. A controller can be configured to selectively operate the reservoir, e.g., to control buoyancy of the seismic cable system. In some examples, the buoyancy is responsive to changes in the volume within the outer jacket, e.g., based on the transfer of the ballast medium during acquisition of the seismic data by the seismic cable system.

In any of these examples and embodiments, the housing can be configured for mounting coaxially along the seismic cable system between adjacent sections thereof, e.g., further comprising a transfer mechanism configured to transfer the ballast medium into a core of one or more of the adjacent sections, within the volume defined within the outer jacket. Similarly, the housing can be configured for coupling the ballast module about the outer jacket of the seismic cable system, e.g., further comprising a transfer mechanism configured to transfer the ballast medium through a port in the outer jacket.

An interface can be configured for communications between the controller and an eternal trim control processor, e.g., where the controller is configured to selectively operate the reservoir to provide real-time buoyancy and trim control along a length of the seismic cable system, in response to the communications. A pressure sensor can be provided in communication with a water column external to the housing, e.g., where the pressure sensor is responsive to depth in the water column and the controller is configured to selectively operate the reservoir based on the depth.

Seismic data acquisition system embodiments may also be provided, e.g., comprising one or more seismic cables configured for acquiring seismic data. One or more ballast modules may be disposed along each seismic cable, e.g., with each of the ballast modules comprising one or more of a housing configured for mounting the ballast module between adjacent sections of the respective seismic cable; a reservoir disposed within the housing, e.g., with the reservoir containing a ballast fluid; and a transfer mechanism coupled to the reservoir, e.g., with the transfer mechanism configured to transfer the ballast fluid between the reservoir and a volume defined within the respective seismic cable jacket.

Buoyancy along a length of each seismic cable can be controlled by changes in the volume defined within the respective cable jacket, e.g., responsive to the transfer of the ballast fluid. In some examples the ballast fluid can be transferred to an inner or core volume distributed along substantially an entire length of each seismic cable section, e.g., extending along each section between the buoyancy control modules adjacent each opposite end. In other examples the ballast fluid can be transferred to a volume defined between baffles, blocks, impervious baffles or other material or structures configured to limit the longitudinal propagation of the transferred ballast medium to a particular axial extent of the adjacent cable sections or sections.

Any of these examples and embodiments may comprise a processor in communication with the one or more ballast modules, e.g., with the processor configured to trim the buoyancy of each seismic cable along the respective length thereof. The buoyancy may be responsive to selective transfer of the ballast fluid, e.g., as determined by the processor.

One or more interfaces can be configured for peer-to-peer communication of a recovery signal among the one or more ballast modules, e.g., whereby each ballast module is configured to transfer the ballast fluid to provide positive buoyancy to an adjacent section of the respective seismic cable system, in response to the recovery signal. A port may be defined in each reservoir, e.g., with the port configured for one or both of replenishing the ballast fluid in the reservoir disposed within the housing or extracting the ballast fluid from the reservoir to an external vessel disposed outside the housing.

In any of these examples and embodiments, suitable methods of operation may include one or more steps of deploying a seismic cable to a seismic medium; acquiring seismic data with the seismic cable; operating a ballast module to transfer a ballast medium between a reservoir and one or more adjacent sections of the seismic cable, e.g., where the reservoir is disposed within a housing configured for mounting the ballast module between the adjacent sections; and controlling a buoyancy of the seismic cable, e.g., where the buoyancy is responsive to the transfer of the ballast medium to a volume defined within the cable jacket of the one or more adjacent sections. For example, the volume may be responsive to radial expansion or contraction of the cable jacket upon transfer of the ballast medium.

Suitable methods of operation may include one or more of controlling trim along the one or more adjacent sections of the seismic cable during acquisition of the seismic data, e.g., where a depth of the seismic cable is maintained responsive to the buoyancy, and retrieving the seismic cable to a seismic vessel, and storing the seismic cable between successive acquisitions of the seismic data with the ballast module mounted between the adjacent sections. Suitable methods may also include one or more of extracting the ballast medium from the reservoir for storing the seismic cable, and replenishing the ballast medium in the reservoir prior for deploying the seismic cable.

A buoyancy control device for a streamer or seismic cable system can thus include one or more of a reservoir for a ballast fluid or other medium, e.g., with an actuator or transfer mechanism configured to transfer the ballast fluid between the reservoir and adjacent sections of a seismic cable, or back and forth between the reservoir and the adjacent seismic cable. Transfer of the fluid can change the buoyancy or ballast condition of the seismic cable system, in response to changes in the cable volume and effective specific gravity, e.g., by increasing or decreasing the outer diameter or interior (core) volume within the cable jacket to achieve cable recovery or real-time trim control during seismic data acquisition. Particular examples include, but are not limited to:

1. A system comprising: a means of or apparatus for changing the specific gravity of a seismic cable during seismic data acquisition.

2. The system of example 1, wherein the system comprising: a means of or apparatus for changing the volume of a seismic cable by injecting a gaseous, liquid or fluid material into the cable during seismic data acquisition.

3. The system of example 2, wherein the system comprising: a means of or apparatus for transferring a ballast medium from a vessel mounted serially and concentrically on a seismic cable(s) into a seismic streamer during seismic data acquisition.

4. A system comprising: a network of ballast modules capable of or adapted for peer-to-peer communication in the event of cable failure.

5. The system of example 2 or example 4, wherein the system comprising: a means of or apparatus for transferring a ballast medium from a vessel mounted coaxially on one or more seismic cables into a seismic streamer during seismic data acquisition.

6. The system of example 2 or example 4, wherein the system comprising: a means of or apparatus for sensing pressure or depth, and a means of or apparatus for transferring a ballast medium between the vessel and an interior of a seismic cable.

7. The system of example 1 or example 4, wherein the system can or is configured to communicate with a shipboard system inductively or via direct electrical interface.

8. A method for storing a ballast system of any of examples 1 through 3 on a winch.

9. A means for or apparatus adapted to restrict an injected ballast medium along the length of a cable, as described herein.

10. A means for or apparatus adapted to monitor a plurality of ballast modules during seismic data acquisition, as described herein.

11. A means for or apparatus adapted to extract the ballast medium and return the cable to service, as described herein.

While this invention has been described with reference to exemplary embodiments, it will be understood by those skilled in the art that various changes can be made and equivalents may be substituted without departing from the spirit and scope thereof. Modifications may also be made to adapt the teachings of the invention to particular problems, technologies, materials, applications and materials, without departing from the essential scope thereof. Thus, the invention is not limited to the particular examples that are disclosed herein, but encompasses all embodiments falling within the scope of the appended claims.

The invention claimed is:

1. An apparatus comprising:
   a seismic cable system configured to acquire seismic data, the seismic cable system having a cable jacket;
   a reservoir for ballast fluid;
   a transfer mechanism configured to transfer the ballast fluid between the reservoir and the seismic cable system during acquisition of the seismic data, wherein the ballast fluid is transferred to the seismic cable system within the cable jacket;
   a controller configured to adjust a buoyancy of the seismic cable system responsive to the transfer of the ballast fluid;
   a modular housing disposed about the reservoir and the fluid transfer mechanism, wherein the modular housing is configured for mounting coaxially along the seismic cable system, wherein the modular housing is configured for coupling about the outer jacket of the seismic cable system; and
   a port configured for transferring the ballast fluid from the reservoir through an outer diameter of the cable jacket.

2. The apparatus of claim 1, wherein the buoyancy of the seismic cable system is responsive to expansion of the cable jacket upon transfer of the ballast fluid from the reservoir.

3. The apparatus of claim 1, wherein the fluid transfer mechanism is configured to selectively transfer the ballast fluid along a length of the seismic cable system and the buoyancy is responsive to changes in a cross-sectional area of the cable jacket along the length.

4. The apparatus of claim 1, wherein the controller is configured to trim the buoyancy along a length of the seismic cable system by selectively transferring the ballast fluid during acquisition of the seismic data.

5. The apparatus of claim 1, wherein the transfer mechanism comprises a pump or valve configured to transfer the ballast fluid between the reservoir and a volume defined within an outer diameter of the cable jacket.

6. The apparatus of claim 1, wherein the ballast fluid is selected to match an acoustic impedance of the cable jacket.

7. The apparatus of claim 1, further comprising an external water column pressure sensor responsive to depth of the seismic cable system in the external water column proximate the pressure sensor, wherein the reservoir comprises a pressure vessel configured to release the ballast fluid into a volume defined within the cable jacket responsive to the depth.

8. The apparatus of claim 1, further comprising first and second axial couplings configured for connecting the modular housing in-line between first and second adjacent sections of the seismic cable system, and further comprising an electronics module configured for data communication between the adjacent sections during acquisition of the seismic data.

9. The apparatus of claim 8, further comprising an axial fluid coupling configured for transferring the ballast fluid from the reservoir into one or more of the adjacent sections seismic cable system, within an outer diameter of the cable jacket.

10. A ballast module comprising:
a housing adapted for mounting the ballast module along a seismic cable system configured for acquiring seismic data;
a reservoir disposed within the housing, the reservoir configured to transfer a ballast medium between the reservoir and a volume defined within an outer jacket of the seismic cable system, wherein the housing is configured for coupling the ballast module about the outer jacket of the seismic cable system;
a transfer mechanism configured to transfer the ballast medium through a port in the outer jacket; and
a controller configured to selectively operate the reservoir to control buoyancy of the seismic cable system, wherein the buoyancy is responsive to changes in the volume based on the transfer of the ballast medium during acquisition of the seismic data by the seismic cable system.

11. The ballast module of claim 10, wherein the housing is configured for mounting coaxially along the seismic cable system between adjacent sections thereof, and further comprising a transfer mechanism configured to transfer the ballast medium into a core of one or more of the adjacent sections, within the volume defined within the outer jacket.

12. The ballast module of claim 10, further comprising an interface configured for communications between the controller and an eternal trim control processor, wherein the controller is configured to selectively operate the reservoir to provide real-time buoyancy and trim control along a length of the seismic cable system in response to the communications, during acquisition of the seismic data.

13. The ballast module of claim 10, further comprising a pressure sensor in communication with a water column external to the housing, wherein the pressure sensor is responsive to depth in the water column and the controller is configured to selectively operate the reservoir based on the depth.

14. A seismic data acquisition system comprising:
one or more seismic cables configured for acquiring seismic data;
one or more ballast modules disposed along each of the seismic cables, each of the ballast modules comprising:
a housing configured for mounting the ballast module between adjacent sections of the respective seismic cable, wherein the housing is configured to couple the ballast module about an outer jacket of the respective seismic cable;
a reservoir disposed within the housing, the reservoir containing a ballast fluid, wherein the reservoir is configured to transfer the ballast fluid between the reservoir and the respective seismic cable; and
a transfer mechanism coupled to the reservoir, the transfer mechanism configured to transfer the ballast fluid between the reservoir and a volume defined within the outer jacket of the respective seismic cable, through a port in the outer jacket;
wherein buoyancy along a length of each of the seismic cables is controlled by changes in the volume defined within the respective cable jacket, responsive to the transfer of the ballast fluid.

15. The system of claim 14, further comprising a processor in communication with the one or more ballast modules disposed on one of the seismic cables, the processor configured to trim the buoyancy of the respective seismic cable along the respective length thereof, wherein the buoyancy is responsive to the transfer of the ballast fluid between the respective ballast modules and the volume defined within the inner jacket of the respective seismic cable, as determined by the processor.

16. The system of claim 15, further comprising one or more interfaces configured for peer-to-peer communication of a recovery signal among the one or more ballast modules disposed along the one or more seismic cables, whereby each of the ballast modules is configured to transfer the ballast fluid to provide positive buoyancy to an adjacent section of the respective seismic cable in response to the recovery signal.

17. The system of claim 15, further comprising a port defined in each reservoir, the port configured for one or both of replenishing the ballast fluid or extracting the ballast fluid to an external vessel disposed outside the respective housing.

18. A method comprising:
deploying a seismic cable to a seismic medium;
acquiring seismic data with the seismic cable;
operating a transfer mechanism of a ballast module to transfer a ballast medium between a reservoir and a volume defined in a cable jacket of one or more adjacent sections of the seismic cable via a port defined in the cable jacket, wherein the reservoir is disposed within a housing configured for mounting the ballast module about the cable jacket between the adjacent sections of the seismic cable; and
controlling a buoyancy of the seismic cable, wherein the buoyancy is responsive to the transfer of the ballast medium to a volume defined within the cable jacket of the one or more adjacent sections of the seismic cable.

19. The method of claim 18, wherein the volume is responsive to radial expansion or contraction of the cable jacket upon the transfer of the ballast medium.

20. The method of claim 18, further comprising controlling trim along the one or more adjacent sections of the seismic cable during acquisition of the seismic data, wherein a depth of the seismic cable is maintained responsive to the buoyancy.

21. The method of claim 20, further comprising retrieving the seismic cable to a seismic vessel and storing the seismic cable between successive acquisitions of the seismic data with the ballast module mounted between the adjacent sections.

22. The method of claim 21, further comprising one or more of extracting the ballast medium from the reservoir for storing the seismic cable and replenishing the ballast medium in the reservoir prior for deploying the seismic cable.

\* \* \* \* \*